(12) United States Patent
Reshad et al.

(10) Patent No.: US 8,746,815 B2
(45) Date of Patent: Jun. 10, 2014

(54) TRACK-MODULE APPARATUS AND OPEN LIGHTWEIGHT DRIVE WHEEL THEREFOR

(75) Inventors: Jamsheed Reshad, Newburgh, IN (US); Duane Tiede, Naperville, IL (US)

(73) Assignee: ATI, Inc., Mt. Vernon, IN (US)

( * ) Notice: Subject to any disclaimer, the term of this patent is extended or adjusted under 35 U.S.C. 154(b) by 357 days.

(21) Appl. No.: 13/193,124

(22) Filed: Jul. 28, 2011

(65) Prior Publication Data

US 2013/0026819 A1    Jan. 31, 2013

(51) Int. Cl.
*B62D 55/12* (2006.01)

(52) U.S. Cl.
USPC .............................. 305/135; 305/115; 305/195

(58) Field of Classification Search
USPC .......................... 305/135, 195, 115, 178, 199
See application file for complete search history.

(56) References Cited

U.S. PATENT DOCUMENTS

| | | | | |
|---|---|---|---|---|
| 1,852,197 | A * | 4/1932 | Wilson | 305/115 |
| 1,853,308 | A * | 4/1932 | Humphreys et al. | 305/115 |
| 3,680,651 | A | 8/1972 | Termont | |
| RE36,284 | E | 8/1999 | Kelderman | |
| 6,283,556 | B1 | 9/2001 | Taylor | |
| 6,536,854 | B2 | 3/2003 | Juncker et al. | |
| 6,543,862 | B1 | 4/2003 | Kahle et al. | |
| 7,156,185 | B2 * | 1/2007 | Juncker | 172/292 |
| 7,370,918 | B2 | 5/2008 | Tucker | |
| 8,291,993 | B2 * | 10/2012 | Juncker | 172/80 |
| 8,430,188 | B2 * | 4/2013 | Hansen | 180/9.26 |

OTHER PUBLICATIONS

Discontinued product of Fargo Products, Fargo, ND, offered and sold a few years ago.

* cited by examiner

*Primary Examiner* — Drew Brown
(74) *Attorney, Agent, or Firm* — Jansson Munger McKinley & Shape Ltd.

(57) ABSTRACT

A vehicle track-module including an upper drive wheel, a plurality of idler and bogey wheels, and an endless rubber track with spaced lugs which extends around the wheels and is driven by the drive wheel, which has: a middle main plate with a outer edge of first diameter and inward and outward sides forming the exposed inward and outward surfaces of the drive wheel; drive members axially across and projecting radially beyond the main-plate edge to a second diameter, each drive member having axially inward and outward end portions, a middle portion affixed at its middle position to the main-plate edge, and an outer track-engaging surface; and a rigidity ring affixed to the inward end portions of the drive members and having an inner diameter no less than half the first diameter and an outer diameter no greater than the second diameter. In some embodiments, the axial dimension of the track-engaging surfaces of the drive members is at least 50% greater than the axial dimension of the track lugs. In some, the track module has preferably annular wheel-weights around the central portion of the drive wheel.

17 Claims, 5 Drawing Sheets

TRACK-MODULE APPARATUS AND OPEN LIGHTWEIGHT DRIVE WHEEL THEREFOR

FIELD OF THE INVENTION

The invention relates generally to the field of vehicle track-module systems of the type typically for use in place of vehicle wheels and, more particularly, to the single upper drive wheels the upper portions of which are engaged by an endless flexible rubber track that also extends around lower portions of a plurality of ground-adjacent idler and bogey wheels to hold the driven track along the ground for purposes of moving the vehicle.

BACKGROUND OF THE INVENTION

Agricultural vehicles such as tractors, combines and the like are commonly used in agricultural fields for a variety of jobs, and construction vehicles and other large work vehicles are used for many different jobs on a variety of ground surfaces. Typically, these vehicles have large wheels with tires on which the vehicles are supported on the ground. However, for improved traction, vehicle-track module systems (or "track modules") are used in place of wheels with tires, and such track-module systems provide a much larger ground-surface engagement area that spreads vehicle weight and tends to prevent vehicles from becoming bogged down in mud or other soft ground surfaces.

Each such track module has a large upper drive wheel connectable with respect to a vehicle axle for rotation therewith, a plurality of idler and bogey wheels, and an endless flexible rubber (i.e., rubber or rubber-like) track with a main inner surface and spaced track lugs projecting inwardly therefrom, the track extending around the wheels and being driven by its engagement with the drive wheel. Such drive wheels, of course, have circumferentially-spaced drive members engageable with the track lugs.

Over recent decades a number of significant advances have been made in vehicle track-module systems, some examples of which are the improvements described in U.S. Pat. Nos. Re 36,284 (Kelderman), 6,543,862 (Kahle et al.), and 6,536,854 (Juncker et al.), owned by ATI, Inc. of Mount Vernon, Ind., assignee of the invention disclosed and claimed herein. The drive wheel structures of the '862 and '854 patents have served to reduce track wear by reducing shearing forces on track lugs. The absence of track-interfering side structure and the resulting allowance of free adjustability of the track in its side-to-side position on the drive wheel, was part of these advances, and the improvement was important particularly given that early excessive track wear has been a primary concern when it comes to track-module technology. Nevertheless, despite the significant advances made in track-module technology, there remains a need for improved apparatus, including a need for improved drive wheels which will overcome some of the problems and shortcomings of the prior art.

Among the pressing needs with respect to track modules and track-module drive wheels is a need for much lighter equipment. In the past, operational requirements have led to drive wheel configurations which are heavy. It is recognized that lighter drive wheels would mean lesser costs and greater operational efficiencies. There has been a continuing need for lighter track-module drive wheels, and the naturally-resulting lighter track modules, without compromising on operational requirements.

Another continuing need is the need to facilitate installation of the endless rubber tracks on track modules. Past configurations have necessitated often cumbersome and, therefore, disagreeable procedures for track removal and installation. In some cases, removal and installation may require removing an idler wheel to allow removal and/or installation to proceed. There has been a continuing need to facilitate rubber track removal and installation.

Yet another disadvantage of track modules and track-module drive wheels of the prior art has been the fact that it is difficult or impossible to properly accommodate, by weighting, a particular track module to differing vehicles with differing horsepower ratings. There has been a continuing need for a track-module or track-module drive wheel that readily allows weight adjustment to accommodate a particular vehicle.

Still another problem in the field of track modules, indeed, a problem recognized by some past improvements, has been the problem of allowing the on-going clearing of mud and debris from between and along the track and drive wheel. There has been a need for a drive wheel with a high degree of openness in order to minimize the accumulation or ingestion of mud and debris. Avoiding or minimizing accumulation of mud and debris tends to increase operational efficiency and effective interaction of track and drive wheel.

Another problem has been the fact that track-module drive wheels of the prior art which have an outer band from which drive members project can in effect present varying pitch diameters during the driving interaction with track lugs. In addition, this can be exacerbated by the accumulation of mud and debris depending on the configuration of the contact surfaces between the rubber track and the drive wheel. Different pitch diameters can cause excessive track wear due to stresses within the track material. There is a continuing need for a drive wheel configuration that eliminates or minimizes variations in pitch diameter.

The aforementioned needs and problems have largely been intractable needs and problems. A solution to such problems which still retains the advantages of track-module technology and even retains the advantages of automatic track-wheel adjustability during operation that the absence of interfering drive wheel side structure has provided, would be an important advance in the art.

OBJECTS OF THE INVENTION

It is an object of this invention to provide an improved track-module apparatus and track-module drive wheel that overcome certain problems and shortcomings of the prior art, including those referred to above.

More specifically, one object of this invention is to provide an improved track module and track-module drive wheel which are lightweight and thus facilitate efficient operation.

Another object of this invention is to provide an improved track-module apparatus and track-module drive wheel which avoid or minimize the accumulation and removal of mud and debris along and between the drive wheel and the rubber track.

Another object of this invention is to provide improved track-module apparatus and drive wheel which significantly facilitate removal and installation of the rubber track from the track module.

Still another object of this invention is to provide an improved track-module apparatus and track-module drive wheel which readily allow a particular track module to accommodate the size/horsepower rating of the vehicle with which the module will be used.

Another object of this invention is to provide an improved track-module apparatus that reduces track wear related to pitch-diameter differences by minimizing differences in pitch diameter.

Another object of this invention is to provide a track-module and track-module drive wheel which providing such advantages and solutions without compromising on operating requirements of such apparatus.

BRIEF SUMMARY OF THE INVENTION

This invention is an improvement in vehicle track-module apparatus of the type including an upper drive wheel connectable with respect to a vehicle axle for rotation therewith, a plurality of idler and bogey wheels, including first and second idler wheels and one or more bogey wheels therebetween, and an endless flexible rubber track with a main inner surface and spaced lugs projecting therefrom, the track extending around the wheels and driven by its engagement with the drive wheel. The characteristics of the invention result in an improved track module and track-module drive wheel overcoming the problems and shortcomings described above. In describing the improved drive wheel, the terms "axial" and "radial" used in various forms refer to the drive-wheel axis.

In one aspect of the invention, the drive wheel includes: (1) a circular middle main plate having a central portion adapted for connection with respect to the vehicle axle, the plate terminating circumferentially in an edge of first diameter and having inward and outward sides forming the inward and outward surfaces of the drive wheel, i.e., the exposed sides thereof; (2) circumferentially-spaced drive members extending axially across and projecting radially beyond the main-plate edge to a second diameter, each drive member having axially inward and axially outward ends and a middle portion therebetween that is affixed at a middle position thereof to the main-plate edge, and an outer track-engaging surface; and (3) a substantially flat rigidity ring concentric with the middle main plate and affixed to the drive members at the inward end portions thereof, the ring having an inner diameter no less than about half the first diameter and an outer diameter no greater than about the second diameter.

In certain preferred embodiments, the inner diameter of the rigidity ring is no less than the first diameter, i.e., the diameter of the circular middle plate. This keeps weight low, keeps the side surfaces of the middle main plate exposed, and provides the manufacturing advantage of allowing both the rigidity ring and the circular middle plate to be cut from the same metal plate. In some preferred embodiments, at least one annular wheel-weight is attached at one of the side surfaces of the middle main plate around the central portion thereof, most preferably at the outward side of the middle main plate. The well-exposed side surfaces of the middle main plate facilitate easy attachment of such wheel-weight(s).

In preferred embodiments, the difference between the second diameter, i.e., the diameter determined by the outward extent of the drive members, and the first diameter, i.e., the diameter of the circular middle main plate to which the drive members are attached, is greater than the length of inward lug projection from the main inner surface of the track. This difference is important because it reduces belt wear due to differences in pitch diameter that would otherwise exist when driving loads are present at both the first diameter and the second diameter, i.e., when work is being done by belt surfaces contacting wheel structure at both diameters.

In some preferred embodiments, the rigidity ring affixed at the inward end portions of the drive members is somewhat offset from the inward ends themselves. This allows the drive-member outer surfaces to extend inwardly, and provides drive-member outer surface length and the possibility of a smaller outer diameter for the rigidity ring.

Certain embodiments of the inventive drive wheel further include lug support members each of which is affixed with respect to the edge of the middle main plate between an adjacent pair of drive members and each of which has a lug support surface positioned for engagement with a distal end of one of the track lugs.

In another aspect of the invention, the drive wheel includes a circular middle main plate as described above and circumferentially-spaced drive members each of which has axially inward and outward ends and a middle portion therebetween that is affixed at a middle position thereof to the main-plate edge, and an outer track-engaging surface with an axial dimension at least about 50% greater than the axial dimension of the track lugs. It is more preferable that the axial dimension of the outer track-engaging surface be at least about 65% greater than the axial dimension of the track lugs, and most preferable that it be at least about twice the axial dimension of the lugs. This "wide" dimensioning of the outer track-engaging surfaces of the drive members allows a good deal of relative track-wheel lateral movement during operation, and thus is an important factor in reducing track wear.

In still another aspect of this invention, the track-module apparatus includes an upper drive wheel connectable with respect to a vehicle axle for rotation therewith, a plurality of idler and bogey wheels, and an endless flexible rubber track with a main inner surface and spaced lugs projecting therefrom, the track extending around the wheels and driven by its engagement with the drive wheel, and the improvement is the drive wheel of such track-module apparatus. More specifically, the drive wheel includes: (1) a circular drive-wheel plate with a central portion adapted for connection with respect to the vehicle axle, a side surface, and a circumferential edge of first diameter; (2) circumferentially-spaced drive members extending axially across the drive-wheel plate; and (3) at least one wheel-weight attached to the side surface of the drive-wheel plate in a position radially beyond the central portion thereof.

In preferred embodiments, the wheel-weight is preferably annular, around the central portion of the drive-wheel plate, and most preferably on the outward side of the middle main plate. Some preferred embodiments include a second wheel-weight that is secured adjacent to the first wheel-weight concentrically therewith.

It should be noted that the term "rubber track" as used herein means tracks made of natural rubber, synthetic rubber, or any rubber-like material.

DETAILED DESCRIPTIONS OF PREFERRED EMBODIMENTS

Figure 1:
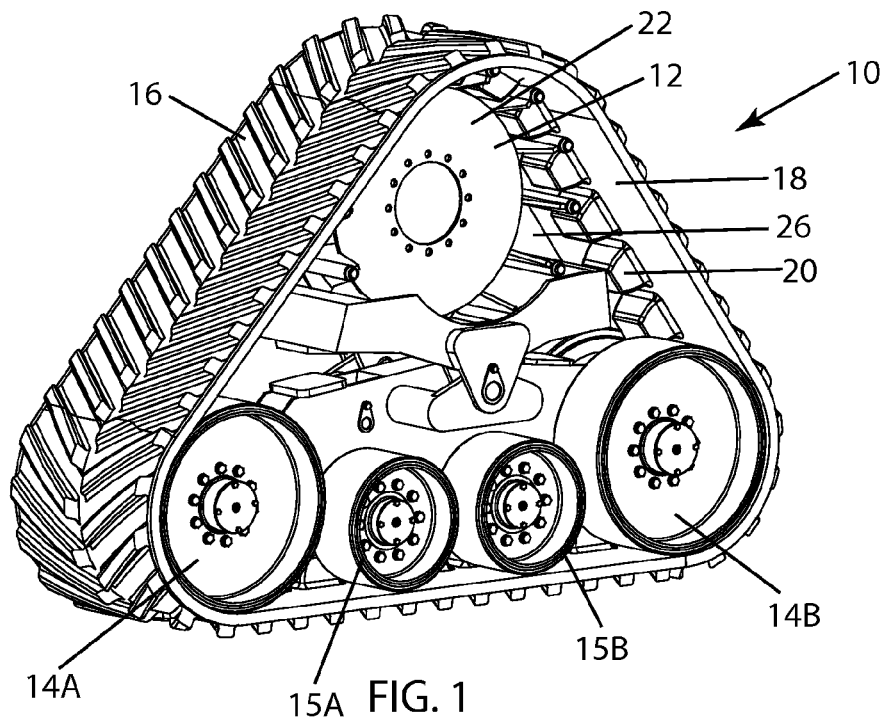
FIG. 1 is perspective view of a preferred track-module apparatus in accordance with the present invention.
Figure 2:
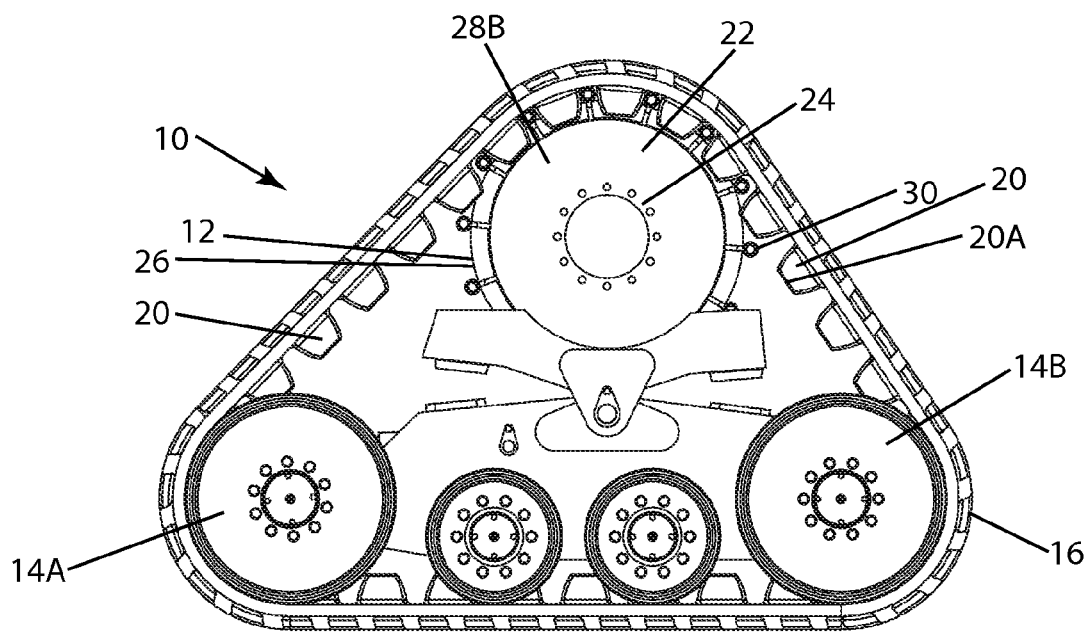
FIG. 2 is a front elevation of the apparatus of FIG. 1.
Figure 3:
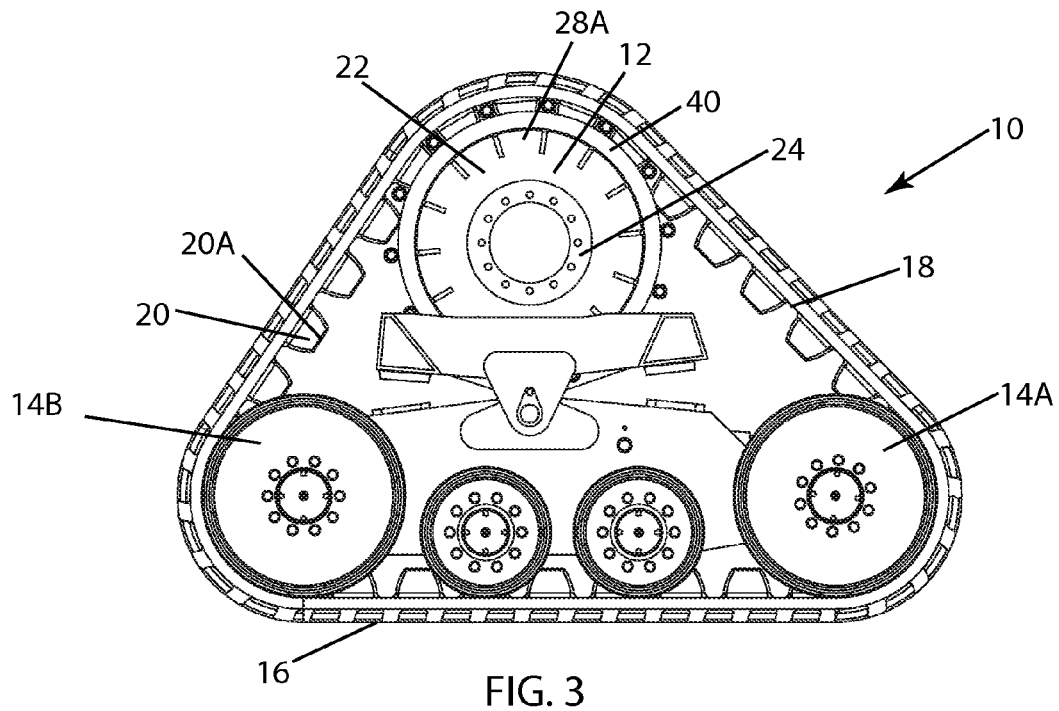
FIG. 3 is a rear elevation of the apparatus of FIG. 1.

FIGS. 1-3 and 6 illustrate a track module 10 in accordance with a preferred embodiment of this invention, and FIGS. 4, 5, 7 and 8 illustrate the improved drive wheel 12 of track module 10.

In addition to drive wheel 12, which is connectable with respect to the axle of a tractor or other work vehicle so that drive wheel 12 rotates therewith, track module 10 includes first and second idler wheels 14A and 14B and a pair of bogey wheels 15A and 15B, all wheels being rotatably mounted to the module structure. An endless flexible rubber track 16 extends around the wheels and is driven by engagement with drive wheel 12. Rubber track 16 includes a main inner surface 18 and a plurality of spaced lugs 20 which project from main inner surface 18.

Figure 4:
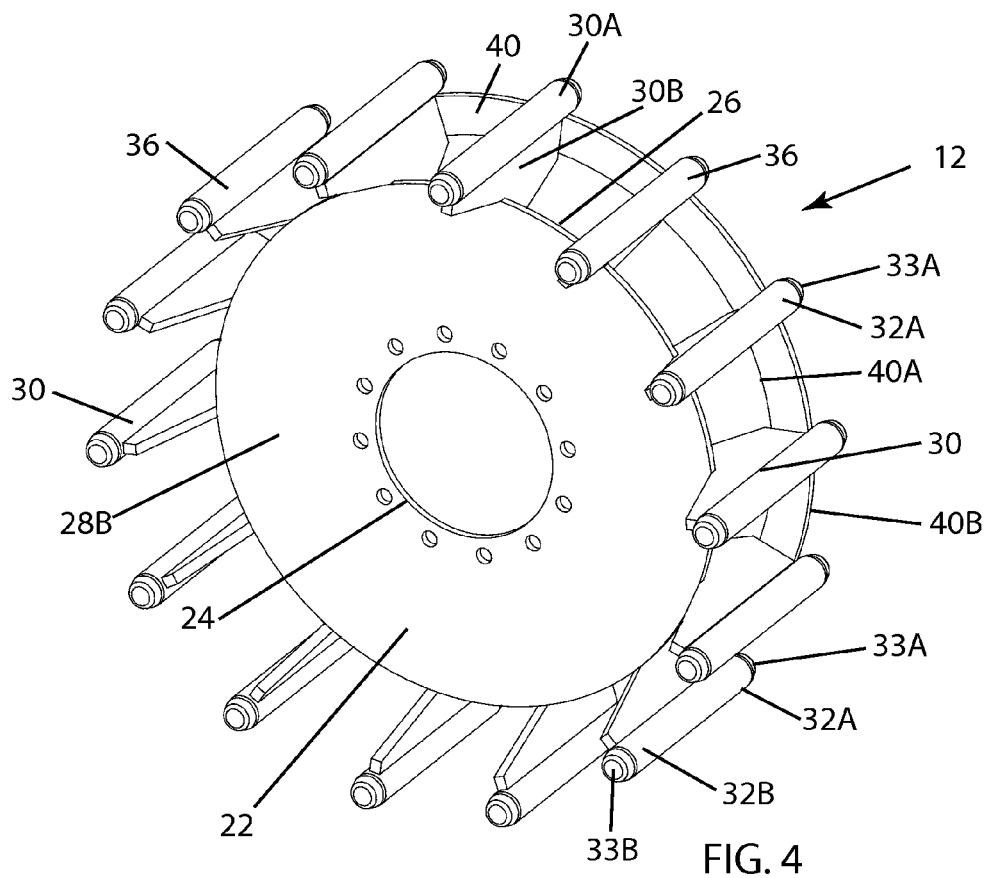
FIG. 4 is an enlarged perspective view of the improved drive wheel of such track-module apparatus.
Figure 5:
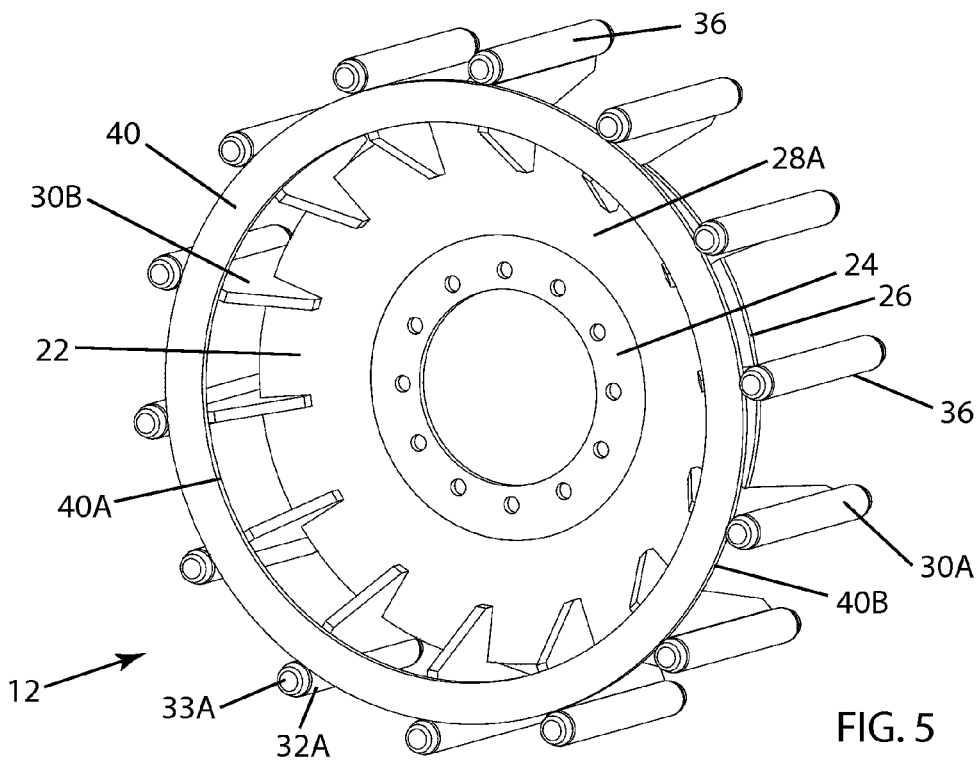
FIG. 5 is an enlarged perspective view of the drive wheel but from the back side of FIG. 4.
Figure 6:
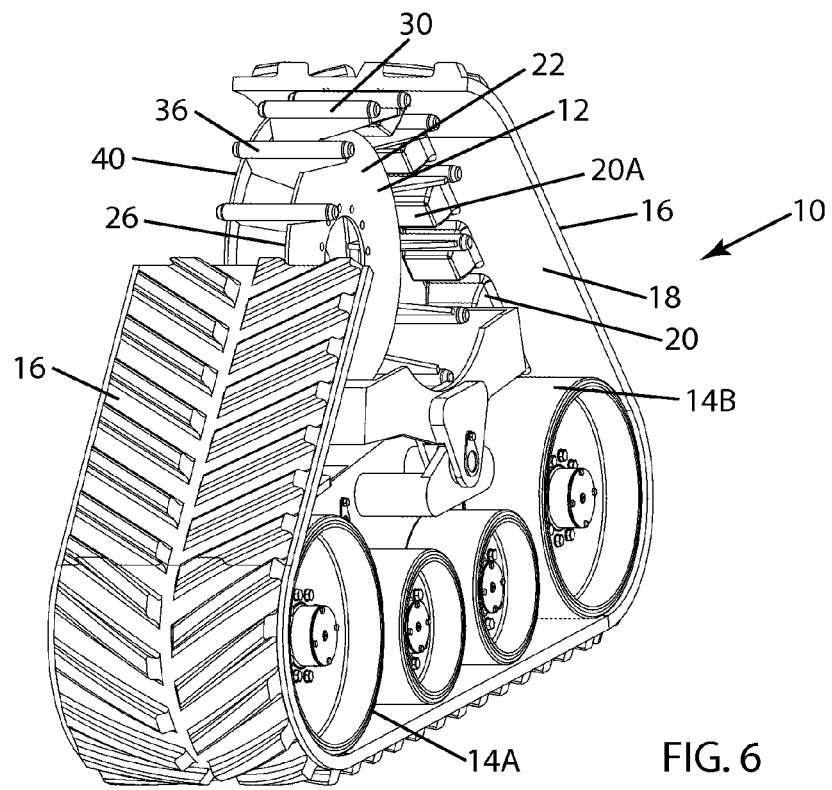
FIG. 6 is another, slightly enlarged, perspective view of the track module apparatus, but with a portion of the rubber track cutaway to better show the drive wheel and its relationship to the rubber track.

As shown best in FIGS. 4 and 5, drive wheel 12 includes a circular middle main plate 22 which has a central portion 24 that is adapted for connection to a vehicle axle by a ring of attachment holes shown. Middle main plate 22 is the sole large plate of drive wheel 12. Plate 22 terminates circumferentially in an edge 26, and the circle formed by edge 26 has a first diameter. Middle main plate 22 has inward and outward sides 28A and 28B, respectively, and given the structure of drive wheel 12, inward and outward sides 28A and 28B form the inward and outward surfaces of drive wheel 12, i.e., the exposed sides of drive wheel 12.

Drive wheel 12 has drive members 30 circumferentially spaced along main-plate edge 22. Drive members 30 extend axially across edge 22 and project radially beyond main-plate edge 26 to a second diameter greater than the first diameter. (It should be understood that the term "diameter" is used in this description in the sense that the circle touching the portions of such drive members that are farthest from the axis of main plate 22 defines a circle having a diameter.) As seen in the drawings, each drive member 30 includes a distal axially-parallel cylindrical portion 30A positioned for track engagement and a drive-member mount 30B.

Each drive member 30, particularly cylindrical portion 30A, has an axially-inward end portion 32A which terminates at an axially-inward end 33A, and an axially-outward end portion 32B which terminates at an axially-outward end 33B, and a middle portion 34 therebetween that is affixed at a middle position thereof to main-plate edge 22 by drive-member mount 30B. Each drive member 30 also has an outer track-engaging surface 36 which is positioned for engagement with rubber track 16; more specifically, inner surface 18 of rubber track 16 and surfaces of track lugs 20 will engage portions of track-engaging surface 36 during driving operations.

Track module 10 also includes a flat rigidity ring 40 which is concentric with middle main plate 22 and is affixed to drive members 30 at inward end portions 32A thereof. Rigidity ring 40 has a circular inner edge 40A having a diameter which is slightly greater than the first diameter, i.e., the diameter of circular middle main plate 22. Rigidity ring 40 is preferably formed by cutting it from the same piece of metal plate stock as is used to form middle main plate 22. The cut line in such manufacturing step results in the diameter of inner edge 40A being slightly greater than the diameter of main plate 22. Rigidity ring 40 also has a circular outer edge 40B which has an outer diameter that is no greater than the second diameter, i.e., the diameter defined by the outermost portions of drive members 30. This serves to eliminate any side surface which could interfere with the lateral movement of track lugs 20 on track-engaging surface 36 of drive members 30.

The difference between the second diameter, i.e., the diameter determined by the outward extent of drive members 30, and the first diameter, i.e., the diameter of circular middle main plate 22 to which drive members 30 are attached, is greater than the length of inward lug projection from main inner surface 18 of track 30—i.e., the radial distance between inner surface 18 and the distal end 20A of track lug 20.

Figure 7:
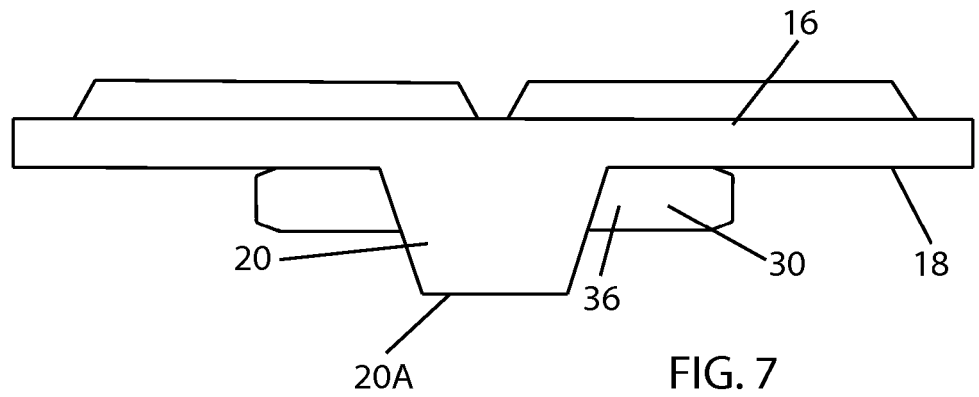
FIG. 7 is a schematic view showing the relative axial dimensions of the track lugs and the outer track-engaging surfaces of the drive members.

As best illustrated schematically in FIG. 7, the axial dimension of drive member 30, in particular, the axial dimension of outer track-engaging surface 36 of cylindrical portion 30A is more than twice the axial dimensions of track lug 20. As described above, the "wideness" of drive members 30 serves to allow a good deal of track-wheel lateral relative movement during operation, and thus is an important factor in reducing track wear.

Figure 8:
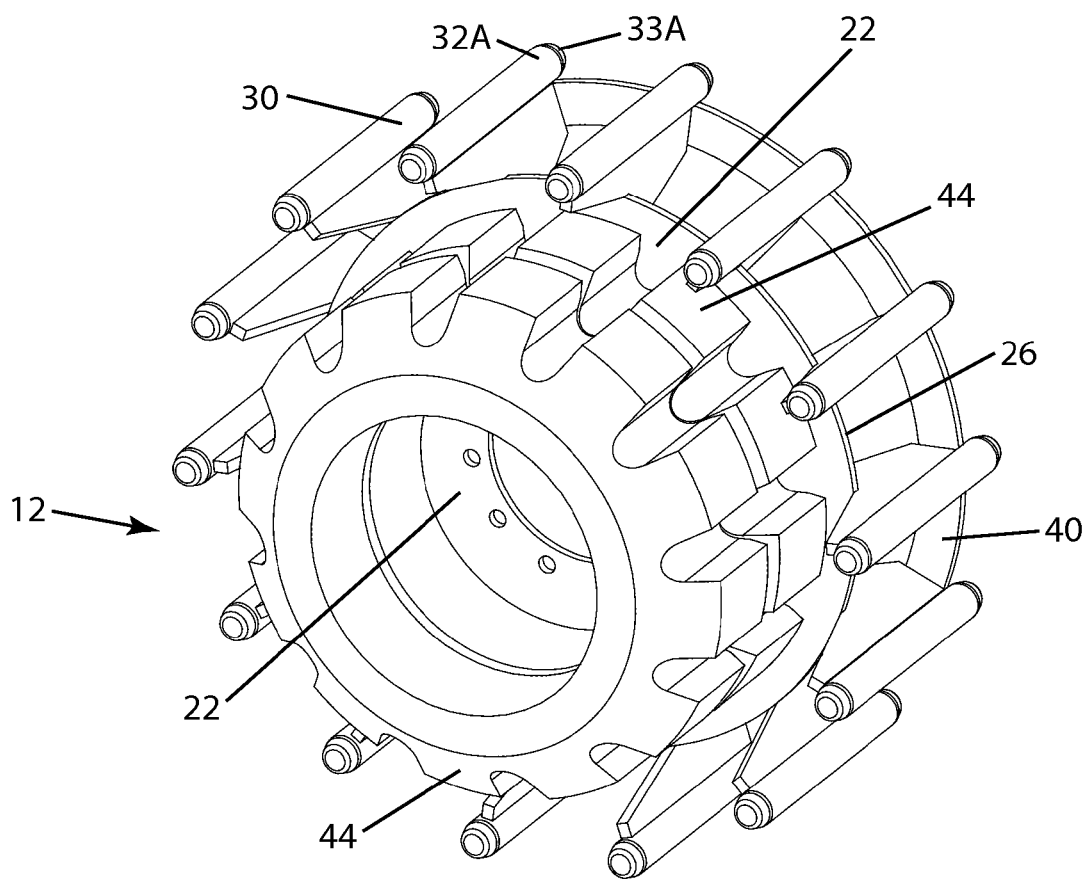
FIG. 8 is a perspective view as in FIG. 4 but showing two annular wheel-weights secured to the drive wheel.

FIG. 8 shows an embodiment of drive wheel 12 which includes two annular wheel-weights 44 concentrically attached to outward side 28B of middle main plate 22. The sizes and number of wheel-weights, if used, can be selected to satisfy the particular operational demands of the vehicle to which track module 10 is attached.

Figure 9:
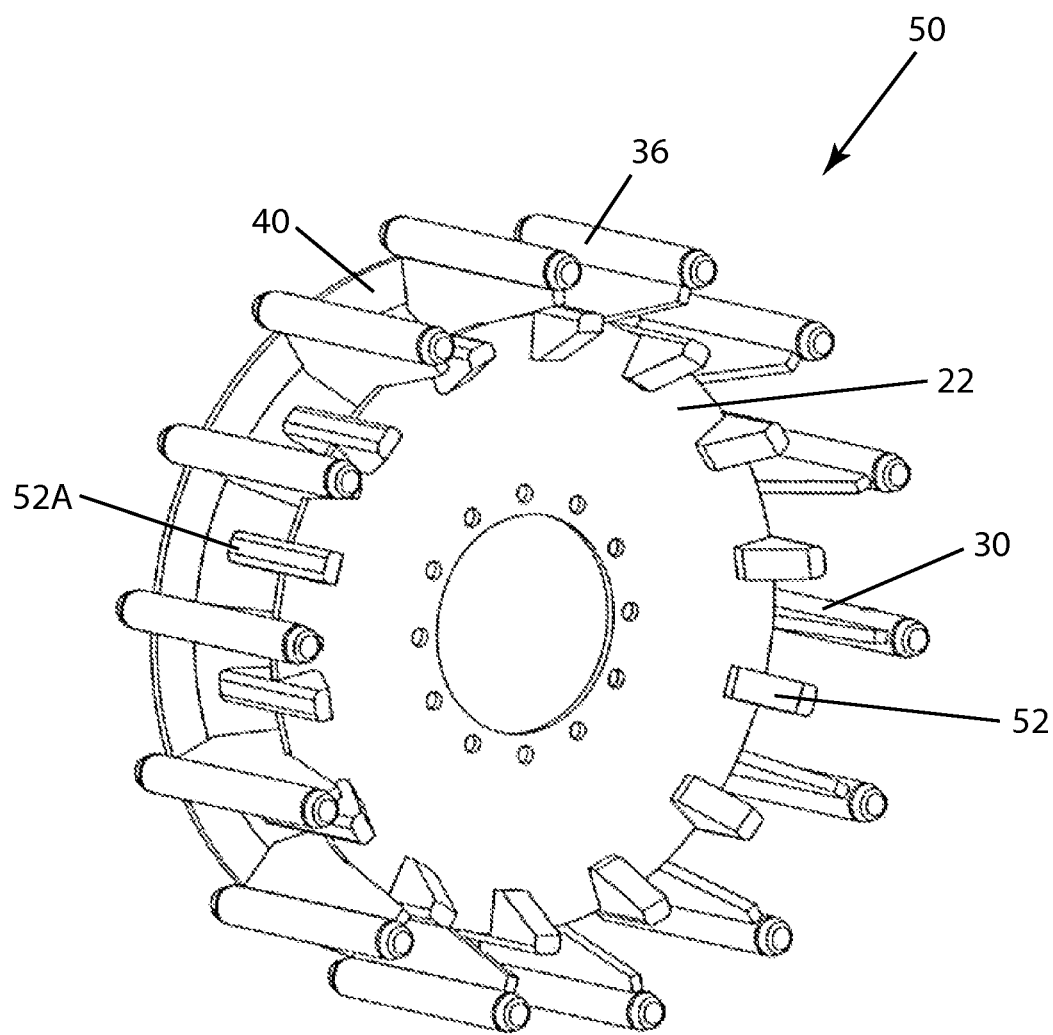
FIG. 9 is a perspective view of the drive wheel of an embodiment of the invention in which the drive wheel includes lug support members between adjacent pairs of drive members.

FIG. 9 illustrates an alternative embodiment of the inventive drive wheel. Drive wheel 50 in FIG. 9 is substantially similar to drive wheel 12, except that drive wheel 50 includes lug support members 52, one positioned between each pair of drive members 30. Lug support members 52 includes a lug support surfaces 52A positioned to contact lug distal surfaces 20A of track lugs 20 during operation of the alternative embodiment. This feature provides some sharing of driving loads transmitted from drive wheel 50 to the endless rubber track.

While the principles of this invention are shown and described here in connection with specific embodiments, it is to be understood that such embodiments are by way of example and are not limiting.

The invention claimed is:

1. In vehicle track-module apparatus including an upper drive wheel connectable with respect to a vehicle axle for rotation therewith, a plurality of idler and bogey wheels, and an endless flexible rubber track with a main inner surface and spaced lugs projecting therefrom, the track extending around the wheels and driven by its engagement with the drive wheel, the improvement wherein the drive wheel comprises:

a circular middle main plate having a central portion adapted for connection with respect to the vehicle axle, the plate terminating circumferentially in an edge of first diameter and having inward and outward sides forming inward and outward surfaces of the drive wheel;

circumferentially-spaced drive members extending axially across and projecting radially beyond the main-plate edge to a second diameter, each drive member having an axially inward end portion, an axially outward end portion, a middle portion therebetween having a middle position, and an outer track-engaging surface, each drive member being affixed with respect to the main-plate edge with the main plate and the middle position substantially aligned; and a substantially flat rigidity ring concentric with the middle main plate and affixed to the drive members at the inward end portions thereof, the ring having an inner diameter no less than about half the first diameter and an outer diameter no greater than about the second diameter.

2. The vehicle track-module apparatus of claim 1 wherein the inner diameter of the rigidity ring is no less than the first diameter.

3. The vehicle track-module apparatus of claim 1 wherein the rigidity ring affixed at the inward end portions of the drive members is offset from the inward ends.

4. The vehicle track-module apparatus of claim 1 further including at least one annular wheel-weight attached to the outward side of the middle main plate around the central portion thereof.

5. The vehicle track-module apparatus of claim 4 wherein the at least one wheel-weight includes a first wheel-weight and a second wheel-weight that is secured adjacent to the first wheel-weight concentrically therewith.

6. The vehicle track-module apparatus of claim 1 wherein the difference between the second and first diameters is greater than the length of lug projection from the main inner surface of the track.

7. The vehicle track-module apparatus of claim 1 further including lug support members each of which is affixed with respect to the middle main plate edge between an adjacent pair of drive members and has a lug support surface positioned for engagement with a distal end of one of the track lugs.

8. The vehicle track-module apparatus of claim 1 further including lug support members each of which is affixed with respect to the middle main plate edge between an adjacent pair of drive members and has a lug support surface positioned for engagement with a distal end of one of the track lugs.

9. The vehicle track-module apparatus of claim 1 wherein the outer track-engaging surface of each of the drive members has an axial dimension at least about 50% greater than the axial dimension of the track lugs.

10. The vehicle track-module apparatus of claim 9 wherein the axial dimension of the track-engaging surface is at least about 65% greater than the axial dimension of the track lugs.

11. The vehicle track-module apparatus of claim 10 wherein the axial dimension of the track-engaging surface is at least about twice the axial dimension of the track lugs.

12. The vehicle track-module apparatus of claim 1 wherein each of the drive members is affixed with respect to the main plate edge by a respective drive-member mount which extends axially to and is affixed to the rigidity ring.

13. The vehicle track-module apparatus of claim 12 wherein each drive-member mount is attached to its respective drive member substantially along the entire length of the drive member.

14. The vehicle track-module apparatus of claim 12 wherein each of the drive-member mounts is a flat plate the plane of which is substantially radially oriented with respect to the vehicle axle.

15. The vehicle track-module apparatus of claim 12 wherein the inner diameter of the rigidity ring is no less than the first diameter.

16. The vehicle track-module apparatus of claim 15 wherein each drive-member mount is attached to its respective drive member substantially along the entire length of the drive member.

17. The vehicle track-module apparatus of claim 15 wherein each of the drive-member mounts is a flat plate the plane of which is radially oriented with respect to the vehicle axle.

* * * * *

UNITED STATES PATENT AND TRADEMARK OFFICE
CERTIFICATE OF CORRECTION

| | | |
|---|---|---|
| PATENT NO. | : 8,746,815 B2 | Page 1 of 1 |
| APPLICATION NO. | : 13/193124 | |
| DATED | : June 10, 2014 | |
| INVENTOR(S) | : Jamsheed Reshad et al. | |

It is certified that error appears in the above-identified patent and that said Letters Patent is hereby corrected as shown below:

Title page, item (54) and in the Specification, col. 1, title, after the word OPEN, delete "LIGHTWEIGHT".

Signed and Sealed this
Sixth Day of October, 2015

Michelle K. Lee
*Director of the United States Patent and Trademark Office*